United States Patent [19]

Obara

[11] Patent Number: 4,806,720
[45] Date of Patent: Feb. 21, 1989

[54] METHOD AND APPARATUS FOR WIRE-CUT ELECTRICAL DISCHARGE MACHINING

[75] Inventor: Haruki Obara, Sagamihara, Japan
[73] Assignee: Fanuc Ltd., Minamitsuru, Japan
[21] Appl. No.: 71,269
[22] PCT Filed: Nov. 17, 1986
[86] PCT No.: PCT/JP86/00584
§ 371 Date: Sep. 21, 1987
§ 102(e) Date: Sep. 21, 1987
[87] PCT Pub. No.: WO87/03232
PCT Pub. Date: Jun. 4, 1987

[30] Foreign Application Priority Data

Nov. 20, 1985 [JP] Japan ................... 60-258744

[51] Int. Cl.$^4$ .................. B23H 7/06; B23H 7/04
[52] U.S. Cl. .................. 219/69 W; 219/69 M
[58] Field of Search ............ 364/474, 475; 219/69 W, 219/69 M; 204/206, 224 M

[56] References Cited

U.S. PATENT DOCUMENTS

| 4,383,159 | 5/1983 | Inoue .................. 219/69 W |
| 4,675,491 | 6/1987 | Marendaz ............. 219/69 C |
| 4,703,146 | 10/1987 | Kinoshita ........... 219/69 W |

FOREIGN PATENT DOCUMENTS

| 57-66827 | 4/1982 | Japan .................. 219/69 W |
| 58-28424 | 2/1983 | Japan .................. 219/69 W |

Primary Examiner—Roy N. Envall, Jr.
Assistant Examiner—Geoffrey S. Evans
Attorney, Agent, or Firm—Staas & Halsey

[57] ABSTRACT

A method for wire electrode type electrical discharge machining and equipment employable therefor realize high accuracy in corner machining, such machining being conducted in combination with taper machining. The tension to be applied to a wire electrode is controlled in proportion to a change in Young's modulus of the wire electrode in addition to decreasing the machining current, whenever a corner machining and a taper machining are conducted in combination. The equipment for wire electrode type electrical discharge machining includes a memory for memorizing information indicating the relationship between the machining current and the amount of tension which is optimum to the machining current, a monitor for monitoring the electric discharge machining current, an optimum tension calculating device for calculating the tension optimum to the monitored machining current, and a tension control device for controlling the tension of the wire electrode in response to the calculated optimum tension.

4 Claims, 3 Drawing Sheets

METHOD AND APPARATUS FOR WIRE-CUT ELECTRICAL DISCHARGE MACHINING

FIELD OF THE INVENTION

This invention relates to a method for wire electrode type electrical discharge machining and equipment employable for wire electrode type electrical discharge machining. More specifically, this invention relates to an improvement applicable to a method for wire electrode type electrical discharge machining in which the angle between the direction in which a wire electrode extends and the direction along the surface of a workpiece varies (hereinafter referred to as taper machining), for the purpose of improving the machining accuracy thereof and for improving equipment employable for wire electrode type electrical discharge machining, for enabling the above mentioned improved method to be performed therewith.

DESCRIPTION OF THE RELATED ART

Wire electrode type electrical discharge machining, which is performed by employing an equipment for wire electrode type electrical discharge machining, is classified into two categories. The first category is ordinary machining, in which the angle of a wire electrode is 90° from workpiece that is, the wire electrode is maintained perpendicular to the direction in which a workpiece is being moved. The second category is the so-called taper machining. In taper machining, the angle between the wire electrode and the direction perpendicular to the direction of motion for a workpiece (the angle by which a wire electrode is inclined or the taper angle) is not zero degrees, or the angle is intentionally varied. In other words, the angle of the wire electrode from the direction of motion for the workpiece is not 90°.

Referring to FIG. 1, taper machining can be conducted by relatively moving upper and lower electrode guides 2U, 2L from side to side as illustrated in FIG. 1. The angle θ from perpendicular for a wire electrode 1 is thereby controlled. In FIG. 1, the upper electrode guide 2U (as shown by dotted lines in the drawing) is moved, giving the angle θ from perpendicular for the wire electrode 1. If this taper angle could be a direct sharp angle, then a taper machining could readily be realized by a servomechanism. Since a wire electrode 1 is elastic, however, the wire electrode 1 does not extend in a straight line between the upper and lower electrode guides 2U, 2L but in a gradually curved line. In other words, the wire electrode 1 does not actually extend as shown by a chain line 25 shown in FIG. 1, but in a solid line 26.

Since taper machining is conducted exclusively by relatively moving the upper and lower electrode guides 2U, 2L from side to side as illustrated in FIG. 1, it is essential to remove any error caused by the aforementioned curvature of the wire electrode 1 between the upper and lower electrode guides 2U, 2L. To remove the error, the reference supporting points of the upper and lower electrode guides 2U, 2L (the last points of contact between the electrode guides 2U, 2L and the wire electrode 1) must be corrected from an end point 21 to a point 22 (the cross point at which a current direction in which the wire electrode 1 actually extends crosses a perpendicular line 27 along which the wire electrode 1 extends in the case where the upper and lower wire guides 2U, 2L are superposed to each other as shown by a dashed dotted line for the upper electrode guide 2U and the line 27 in FIG. 1). This correction is called a positional correction of the supporting points of a machining electrode.

The amount of correction δ by which the wire electrode guide supporting points are shifted is a constant, provided the elasticity of the wire electrode is a constant.

However, when the angle or direction in which a wire electrode proceeds along a workpiece during a machining process is changed to make a turn during a taper machining process (or when a X-Y axis control system changes the direction of a table on which the workpiece is mounted at a corner during a taper machining process), the machining current must be decreased. Otherwise, the pressure caused by an electric spark discharge causes the radius of curvature to become large at the corner, causing the machining error (the error in the finished shape) to become large at the corner.

Therefore, when the angle in which a wire electrode cuts a workpiece during a machining process is changed to make a turn during a taper machining process (or when a X-Y axis control system changes its direction at a corner during a taper machining process), a combined correction is required, wherein the positional correction of the supporting points of machining electrode guides and a change in the machining current, are combined. Otherwise, a high level of machining accuracy can not be expected. This is because decreasing the machining current, which is intentionally applied during a corner-machining during which the angle of the wire electrode as it cuts a workpiece is changed to make a turn, causes a decrease in heat emission in the wire electrode, thereby decreasing the rigidity of the wire electrode and changing the required amount of the positional correction.

The positional correction of the supporting points of a machining electrode can be realized by employing a method disclosed in international patent application No. PCT/JP86/00054 filed by the applicant of this application in Japanese Patent Office as a receiving office. However, the method consists of a plurality of fairly complicated ingredients. Particularly from a practical viewpoint, it is not necessarily easy to frequently change a correction amount of the positional correction.

SUMMARY OF THE INVENTION

An object of this invention is to provide a method for wire electrode type electrical discharge machining, wherein a potential increase in a machining error (the error in a finished shape) is prevented from occurring and the accuracy in machining is improved, during a machining process in which a taper machining and a corner machining, in which the angle of a wire electrode as it works on a workpiece is changed at a corner by changing the direction of an X-Y axis control system, are combined.

An additional object of this invention is to provide equipment employable for wire electrode type electrical discharge machining, wherein a potential increase in the machining error (an error in the finished shape) is prevented from occurring and the accuracy of the machining is improved, during a machining process in which a taper machining and a corner machining in which the angle of a wire electrode as it works on a workpiece is changed at a corner by changing the direction of an X-Y axis control system, are combined.

To achieve the first of the above objects, a method for wire electrode type electrical discharge machining in accordance with this invention comprises:

(a) a combined step in which the tension applied to a wire electrode is decreased and the machining current is decreased (b) such a combined step is conducted during a machining process in which a taper machining and a corner machining (in which the angle of a wire electrode as it works on a workpiece is changed at a corner by changing the direction of a X-Y axis control system) are combined.

This invention is based on the principle described below.

Referring to FIG. 2, the correction amount δ by which wire electrode guide supporting points are shifted, is represented by the following formulae.

In the case where $\theta$ is less than $\theta_0$, $$\delta = \frac{1}{K \cos \theta_0}$$

In the case where $\theta$ is larger than $\theta_0$, $$\delta = \frac{R}{\sin\theta}\left(\cos\theta_0 - \cos\theta + \frac{1}{K^2 R^2}\right)$$

wherein:

R is the radius of curvature of the assumed surface of a machining electrode guide along which a wire electrode 1 contacts the machining electrode guide;

$\theta$ is an angle for which the wire electrode 1 remains in contact with the machining electrode guide; and $\theta_0$ is the maximum angle for which the wire electrode 1 keeps contact with the machining electrode guide.

K is a proportion constant which is represented by $$K^2 = T \times (64^{-1} \times \pi \times d^4 \times E)^{-1}$$

wherein:

d is the diameter of the wire electrode;

E is Young's modulus of the wire electrode; and

T is the tension applied to the wire electrode.

From the above formulae it can be seen that any change in Young's modulus of the wire electrode causes no corresponding change for the correction amount δ of the positional correction of wire electrode guide supporting points, if the tension T which is applied to a wire electrode is correspondginly changed relative to the change in Young's modulus of the wire electrode. In other words, the correction amount δ of the positional correction of wire electrode guide supporting points can be controlled by changing the tension T which is applied to the wire electrode, following a change in Young's modulus of the wire electrode. This invention is based on this principle.

A method for wire electrode type electrical discharge machining in accordance with this invention can be thus restated:

A method for wire electrode type electrical discharge machining comprising:

(a) a first step of controlling the tension applied to a wire electrode in proportion to a change in Young's modulus of the wire electrode, and decreasing the electric current supplied to the wire electrode; and (b) said step being taken when a corner machining and a taper machining are performed in combination or when the direction in which a wire electrode proceeds relative to the surface of a table (more practically, relative to the surface of a workpiece) is changed at a corner while a taper machining is being conducted.

Since a change in Young's modulus of a wire electrode is from the heat caused by machining electric current flowing in the wire electrode, the change in Young's modulus of the wire electrode can be sensed by monitoring the machining electric current. Accordingly, if the relationship between the machining electric current and a tension optimum to the machining electric current is known, the above machining process in accordance with this invention can be realized by monitoring the machining electric current during a machining process, and by applying a tension which is determined to be optimum based on the monitored machining electric current and the above relationship.

The method for the present invention will now be described below in greater detail. Experiments are conducted on a given wire electrode type electrical discharge machining apparatus to determine the relationship between the machining current I and the above mentioned proportion constant K using the tension as a parameter, Then, a change in the tension T which is required following a change in the machining current and which is sufficient to keep the above mentioned proportion constant K unchanged, is determined. This data is illustrated graphically in FIG. 3.

Whenever the angle at which the wire electrode works on a workpiece is changed during a taper machining, a tension T which is applied to the wire electrode is controlled, in accordance with the above determined information, as well as the electric current I to be supplied to the wire electrode, which is decreased.

If the above process is implemented, changing the correction amount δ for the positional correction of wire electrode guide supporting points is rendered unnecessary, even in the instances where a change in the Young's modulus of a wire electrode occurs due to a change in the rigidity of the wire electrode caused by a change in the machining current and the resultant change in the heat caused by the machining current. As a result, an accurate machining becomes possible for taper machining at a corner where a wire electrode changes its direction of progress along the surface of a workpiece, where a decrease of machining current is essential.

Further, to achieve the second of the above objects, equipment for wire electrode type electrical discharge machining in accordance with this invention is provided including means for a taper machining and means for controlling the machining current, while a corner machining is conducted, the equipment being further provided:

(a) a memory means (91) for memorizing the information indicating the relationship between the machining current and the amount of tension which is optimum to the machining current;

(b) a monitor means (12) for monitoring the electric discharge machining current;

(c) an optimum tension calculations means (93) for calculating the tension optimum to the monitored machining current monitored with said monitor means (12); and (d) a tension control means (92) for controlling the tension of the wire electrode (1) in response to the calculated optimum tension given by the optimum tension calculation means (93).

DETAILED DESCRIPTION OF A PREFERRED EMBODIMENT

Figure 1:
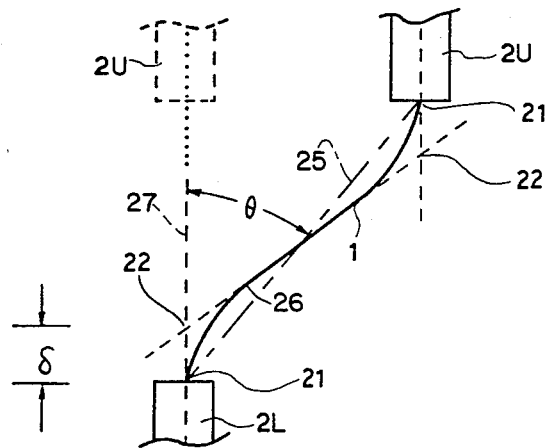
FIG. 1 is a drawing for illustrating the drawback of a prior art removed by this invention.
Figure 2:
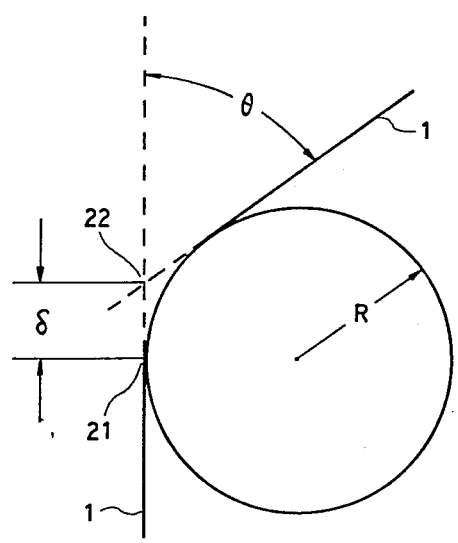
FIG. 2 is a drawing illustrating the function of the present invention.
Figure 3:
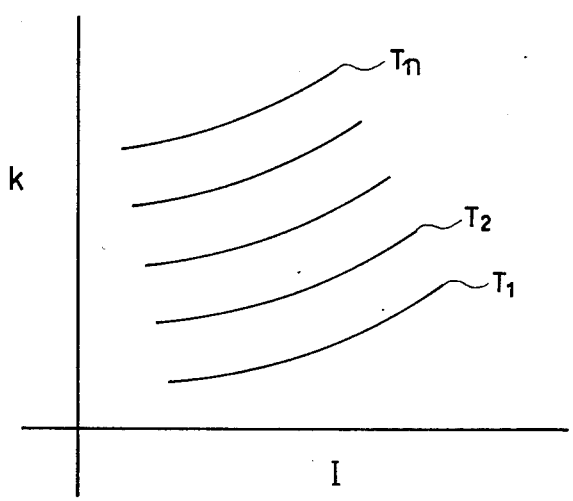
FIG. 3 is a graph employed for implementing the wire electrode type electrical discharge machining in accordance with this invention (or a graph illustrating the relations between the electric discharge machining current I and the proportion constant K)
Figure 4:
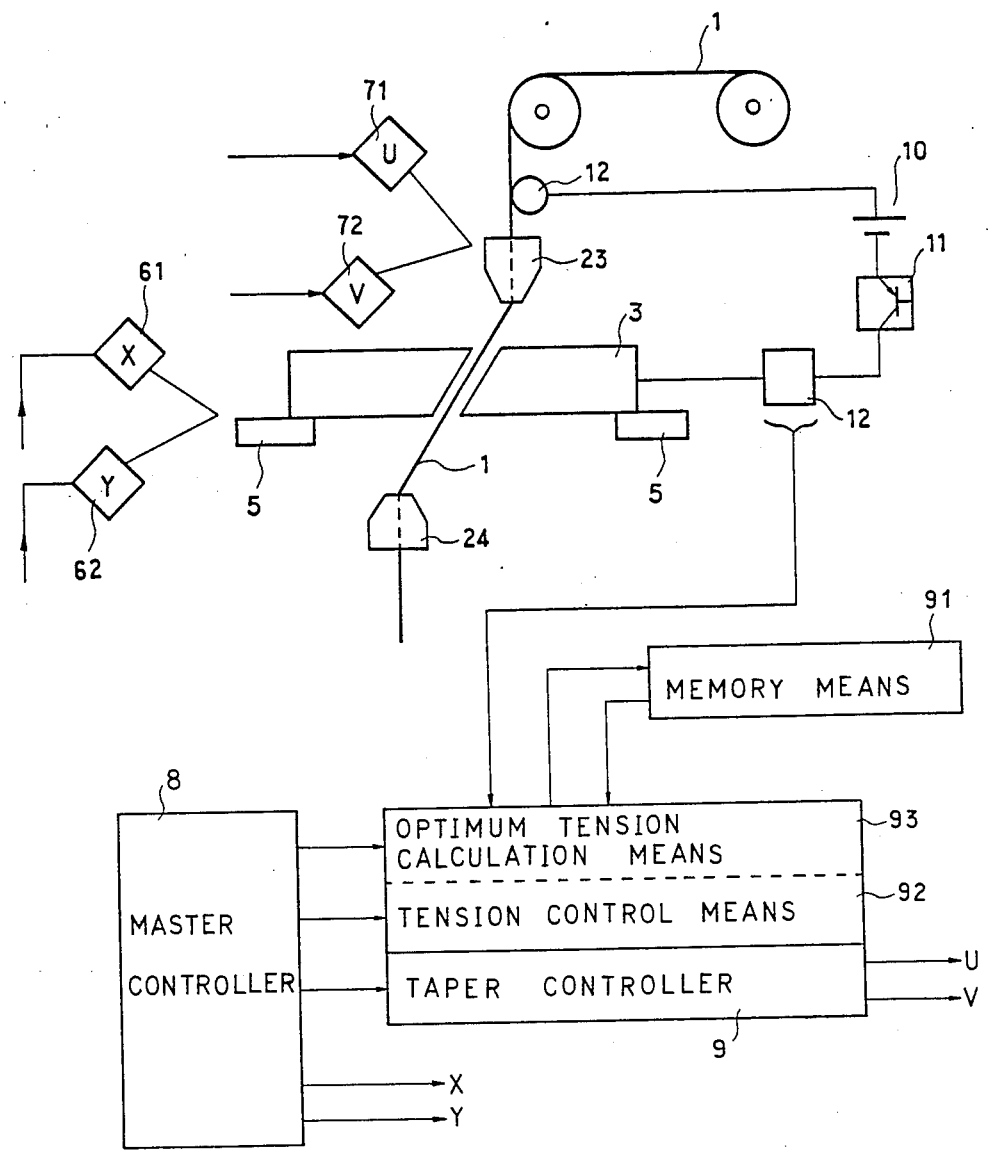
FIG. 4 is a schematic drawing of equipment for wire electrode type electrical discharge machining in accordance with one embodiment of this invention.

Referring to FIG. 4, a wire electrode 1 is guided by upper and lower wire electrode guides 23 and 24. The upper guide 23 is supported by an upper arm (not shown), and the lower guide 24 is supported by a lower arm (not shown). The wire electrode 1 is supported with tension between these two arms. A workpiece is placed on a table 5 arranged between the upper and lower arms movably in the X-Y direction. An X-Y axis servomechanism 61 & 62 drives the table 5 in the X-Y direction. A U-V axis servomechanism 71 & 72 drives the upper wire guide 23 to change the relative position of the upper and lower wire electrode guides 23 and 24 to implement a taper machining. Although a taper machining can be implemented by relatively moving the upper guide 23 the lower guide 24 or both the upper guide 23 only is moved in this embodiment.

A master controller 8 commands some of the equipment used in the wire electrode type electrical discharge machining operation. More specifically, the master controller 8 controls the X-Y axis servomechanism 61 & 62 and the change in the machining current for a corner machining. A taper controller 9 controls the U-V axis servomechanism 71 & 72. These functions can be readily realized by employing computer driven software.

A DC power supply 10, of which the one terminal is connected with the wire electrode 1 through an electric current feeder roller 12 and the other terminal is connected with the workpiece 3 through an intermittent switch means 11 and a machining electric current monitor 12, is intermittently disconnected from the wire electrode 1 by the intermittent switch means 11 resultantly supplying a machining gap which is formed between the wire electrode 1 and the workpiece 3 with a pulsative electric current. As was described above, the machining current is decreased whenever a corner machining is conducted. This control is conducted also during a period in which a taper machining is conducted.

A memory means 91 memorizes the information indicating the relationship between the machining current and the amount of tension which is optimum to the machining current. An optimum tension calculation means 93, in response to the electric current monitored by the electric current monitor 12, which monitors the electric discharge machining current, retrieves the optimum tension from the memory means 91 or calculates the optimum tension based on the information retrieved from the memory means 91. A tension control means 92 controls a servomechanism to realize the optimum tension on the wire electrode 1.

The above control can readily be realized by the computer with which equipment for wire electrode type electrical discharge machining is usually provided.

The foregoing description has clarified that this invention has successfully provided a method for wire electrode type electrical discharge machining, wherein a potential increase in the machining error (an error in the finished shape) is prevented from occurring and the accuracy in machining is improved, during a machining process in which a taper machining and a corner machining are combined. Also provided by this invention is the equipment employable for wire electrode type electrical discharge machining, wherein a potential increase in the machining error (an error in the finished shape) is prevented from occuring and the accuracy in machining is improved, during a machining process in which a taper machining and a corner machining are combined.

Although the foregoing description was presented referring to a specific embodiment, this is not meant to be construed in a limiting sense. Various modifications of the disclosed embodiment, as well as other embodiments of this invention, will be apparent to persons skilled in the art reference to the description of this invention. It is therefore contemplated that the appended claims will cover any such modifications or embodiments as fall within the true scope of this invention.

I claim:

1. A method for wire electrode type electrical discharge machining, wherein the angle between the direction in which a wire electrode extends and a workpiece is allowed to be changed, said method comprising the steps of:

controlling tension applied to said wire electrode in proportion to a change in Young's modulus of said wire electrode; and decreasing electric current supplied to said wire electrode, said controlling and decreasing steps being implemented whenever the direction in which said wire electrode proceeds along the surface of a workpiece is changed at a corner while a taper machining operation is being conducted.

2. A method for wire electrode type electrical discharge machining in accordance with claim 1, further comprising the step of:

monitoring the electric current flowing in said wire electrode to sense said change in Young's modulus of said wire electrode.

3. An apparatus for wire electrode type electrical discharge machining, said apparatus allowing the angle between the direction in which a wire electrode extends and a workpiece to change, said apparatus comprising:

memory means for memorizing information indicating a relationship between a machining current and an amount of tension which is optimum to the machining current;

monitor means for monitoring the machining current;

optimum tension calculation means for calculating an optimum tension for said wire electrode to the machining current monitored with said monitor means; and tension control means for controlling the tension of said wire electrode in response to the optimum tension calculated by said optimum tension calculation means.

4. A device for a wire electrode type optimum discharge machining of a workpiece, said device comprising:
- upper and lower electrode guides movable relative to each other;
- a wire electrode, a portion of which extends from said upper guide to said lower guide for cutting the workpiece;
- a table positioned between said guides for mounting the workpiece, the table being movable in X and Y directions;
- memory means for storing data relative to machining currents and corresponding optimum tensions;
- monitoring means for monitoring a present machining current in said wire electrode;
- optimum tension calculation means for calculating a calculated optimum tension for said wire electrode which corresponds to the present machining current monitored by said monitoring means; and
- tension control means for providing the calculated optimum tension is said wire electrode.

* * * * *